United States Patent
Vervliet et al.

(10) Patent No.: US 10,919,616 B2
(45) Date of Patent: Feb. 16, 2021

(54) GUIDANCE ASSEMBLY FOR AN AIRFOIL LEADING EDGE HIGH-LIFT DEVICE CARRIER TRACK

(71) Applicant: Asco Industries NV, Zaventem (BE)

(72) Inventors: Antoon Marcel Vervliet, Zaventem (BE); Ivo Peter Marie Paulus, Zaventem (BE); Alexander Jean M. Verhuizen, Zaventem (BE); Stein Janssens, Zaventem (BE)

(73) Assignee: ASCO INDUSTRIES NV, Zaventem (BE)

( * ) Notice: Subject to any disclaimer, the term of this patent is extended or adjusted under 35 U.S.C. 154(b) by 663 days.

(21) Appl. No.: 15/656,121

(22) Filed: Jul. 21, 2017

(65) Prior Publication Data

US 2018/0312243 A1 Nov. 1, 2018

(30) Foreign Application Priority Data

Apr. 26, 2017 (EP) .................................... 17168255

(51) Int. Cl.
*B64C 9/02* (2006.01)
*B64C 9/22* (2006.01)
*B64C 9/24* (2006.01)

(52) U.S. Cl.
CPC .................. *B64C 9/02* (2013.01); *B64C 9/22* (2013.01); *B64C 9/24* (2013.01); *Y02T 50/40* (2013.01)

(58) Field of Classification Search
CPC ................ B64C 9/02; B64C 9/24; B64C 9/22
See application file for complete search history.

(56) References Cited

U.S. PATENT DOCUMENTS

| | | | |
|---|---|---|---|
| 2,502,315 A | 3/1950 | Earhart |
| 2,938,680 A | 5/1960 | Greene |
| 3,486,720 A | 12/1969 | Seglem |
| 3,556,439 A | 1/1971 | Autry |
| 4,360,176 A | 11/1982 | Brown |
| 4,687,162 A | 8/1987 | Johnson |
| 4,753,402 A | 6/1988 | Cole |
| 4,838,503 A | 6/1989 | Williams |

(Continued)

FOREIGN PATENT DOCUMENTS

| | | |
|---|---|---|
| CN | 205293063 U | 6/2016 |
| DE | 2054655 A1 | 5/1972 |

(Continued)

OTHER PUBLICATIONS

European Search Report from EP App No. 17208661 dated Apr. 9, 2018.

(Continued)

*Primary Examiner* — Brian M O'Hara
(74) *Attorney, Agent, or Firm* — Adsero IP

(57) ABSTRACT

Guidance assembly for guiding a movement of an airfoil leading edge high-lift device carrier track between a retracted position and an extended position, comprising at least one lower guide element contacting a lower surface of said carrier track and/or at least one upper guide element contacting an upper surface of said carrier track, wherein at least one of said lower or upper guide elements includes a sliding surface arranged to be in sliding contact with said high-lift device carrier track during movement of said carrier track.

15 Claims, 4 Drawing Sheets

(56) References Cited

U.S. PATENT DOCUMENTS

| | | |
|---|---|---|
| 5,544,847 A | 8/1996 | Bliesner |
| 5,681,013 A | 10/1997 | Rudolph |
| 5,836,550 A | 11/1998 | Paez |
| 7,798,450 B2 | 9/2010 | Patzelt |
| 8,181,913 B2 * | 5/2012 | Jaggard .............. B64C 9/02 |
| | | 244/213 |
| 8,393,799 B2 | 3/2013 | Dahl |
| 8,628,045 B2 * | 1/2014 | Lauwereys ........... B64C 9/22 |
| | | 244/213 |
| 8,708,280 B2 * | 4/2014 | Blanchard .......... H02G 11/006 |
| | | 244/131 |
| 8,844,878 B2 | 9/2014 | Voss |
| 9,359,063 B2 * | 6/2016 | Pisacreta .............. F02C 7/222 |
| 9,452,823 B2 | 9/2016 | Havar |
| 9,616,989 B2 | 4/2017 | Parker |
| 2005/0040294 A1 | 2/2005 | Perez-Sanchez |
| 2007/0102587 A1 | 5/2007 | Jones |
| 2009/0127402 A1 | 5/2009 | Jaggard |
| 2009/0146014 A1 | 6/2009 | Gyuricsko |
| 2010/0116944 A1 | 5/2010 | Wollaston |
| 2010/0163685 A1 | 7/2010 | Vormezeele |
| 2010/0258674 A1 | 10/2010 | Sutton |
| 2011/0036944 A1 | 2/2011 | Mann |
| 2011/0101175 A1 | 5/2011 | Lauwereys |
| 2011/0168849 A1 | 7/2011 | Parker |
| 2011/0253832 A1 | 10/2011 | Wildman |
| 2011/0290945 A1 | 12/2011 | Peirce |
| 2011/0290946 A1 | 12/2011 | Peirce |
| 2012/0012712 A1 | 1/2012 | Eden |
| 2012/0241564 A1 | 9/2012 | Parker |
| 2012/0325976 A1 | 12/2012 | Parker |
| 2013/0256461 A1 | 10/2013 | Maenz |
| 2013/0301049 A1 | 11/2013 | Teague |
| 2013/0334364 A1 | 12/2013 | Parker |
| 2015/0298795 A1 | 10/2015 | Parker |
| 2020/0023937 A1 | 1/2020 | Everaert |

FOREIGN PATENT DOCUMENTS

| | | |
|---|---|---|
| EP | 0100775 A | 2/1984 |
| EP | 0873937 B1 | 11/2003 |
| EP | 2134597 B1 | 6/2011 |
| EP | 2282930 B1 | 2/2012 |
| EP | 2 669 191 | 12/2013 |
| EP | 2318269 B1 | 1/2015 |
| EP | 2421751 B1 | 5/2016 |
| EP | 3339163 A1 | 6/2018 |
| GB | 404 149 | 1/1934 |
| GB | 517422 A | 7/1938 |
| GB | 2458683 A | 9/2009 |
| WO | WO 2005/077756 | 8/2005 |
| WO | WO 2012/129223 | 9/2012 |

OTHER PUBLICATIONS

Office Action from EP App. No. 17208661.3 dated Apr. 22, 2020.

Extended European Search Report from EP App No. 17168255.2 dated Oct. 26, 2017.

\* cited by examiner

GUIDANCE ASSEMBLY FOR AN AIRFOIL LEADING EDGE HIGH-LIFT DEVICE CARRIER TRACK

RELATED APPLICATIONS

This application claims priority to European Application No. 17168255.2, filed Apr. 26, 2017, which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The invention relates to a guidance assembly for an airfoil leading edge high-lift device carrier track.

BACKGROUND

Airfoil leading edge high-lift devices are widely used in airfoils. They can be moved between a retracted position and at least one deployed position, in which they are arranged to improve the lift coefficient of the airfoil during for example take-off, climb, descent or landing. In deployed position, the leading edge high-lift device provides for additional aerodynamic forces beneficial during certain stages of a flight, in particular during low speed stages. Leading edge high-lift devices can be embodied as a flap, e.g. a leading edge slotted flap, typically referred to as slat, or as a Krueger flap. Many embodiments of high-lift devices can be possible.

Such leading edge high-lift devices are typically actuated by an actuation system. The actuation system is adjustable between a retracted position, in which said high-lift device is retracted with respect to the airfoil, and at least one deployed position, in which the high-lift device is deployed with respect to the airfoil. The actuation system typically comprises carrier tracks which are pivotally coupled to the leading edge high-lift device, for example to the slat. The tracks exist in various configurations, for example I-shapes or PI-shapes. The tracks are typically guided by a plurality of track roller bearings, of which at least one roller bearing is positioned below the carrier track and at least one roller bearing is positioned above the carrier track. In some configurations, said roller bearings may be complemented by side rollers or pins to assist in centering the carrier tracks on the roller bearings. Many variants of actuation systems are known, such as e.g. described in U.S. Pat. No. 5,544,847, US 20070102587, or US 20090146014.

A drawback with these prior art actuation systems, and in particular with the carrier track roller bearings is that they can take up quite a lot of space in the fixed leading edge, or nose, of the airfoil, where only very limited space is available. They are also relatively heavy and feature a relatively high number of moving parts.

It is an aim of the present invention to solve or alleviate one or more of the above-mentioned drawbacks. In particular, the invention aims at providing an improved guidance assembly for leading edge high-lift device carrier tracks comprising relatively few moving parts and/or that is relatively compact and/or that is relatively light-weight.

SUMMARY OF THE EMBODIMENTS

Thereto, there is provided for a guidance assembly characterized by the features of claim 1. In particular, the guidance assembly for guiding a movement of an airfoil leading edge high-lift device carrier track between a retracted position and an extended position, generally along an arcuate path, comprises at least one lower guide element arranged for contacting a lower surface of said carrier track and at least one upper guide element arranged for contacting an upper surface of said carrier track. At least one of said lower or upper guide element includes a sliding surface arranged to be in sliding contact with said high-lift device carrier track during movement of said carrier track.

A guide element which guides the carrier track in sliding contact has fewer moving parts than, for example guide elements in rotating contact with the carrier track. The guide elements in sliding contact with the carrier track can also be made more compact than rolling elements, which has the double advantage of saving weight and space within the nose of the airfoil.

In a preferred embodiment, each of the guide elements, preferably two lower and two upper guide elements, can be provided with a sliding surface arranged to be in sliding contact with said high-lift device carrier track during movement of said carrier track, in particular with the respective lower and upper contact surface of the carrier track. This has the advantage of further reducing the number of moving, in particular rotating, parts. The guiding assembly can thus be made relatively compact and light-weight, which are important design factors in the design of an airfoil.

Preferably, each of the guide elements has a number of sliding surfaces that corresponds with the number of contact surfaces of the carrier track, considered in movement direction. For example, if the carrier track is H-shaped, it has two contact surfaces, one on each leg of the H both at the upper side and at the lower side, which may be said as "left" and "right" when considering the movement direction. Preferably, the upper guide element, as well as the lower guide element may have two sliding surface of which each sliding surface is in sliding contact with the respective corresponding contact surface of the carrier track. Alternatively, the guide element may be provided with two or more sliding surfaces that are in sliding contact with, for example, the same contact surface of the carrier track, e.g. in case the carrier track has a single contact surface corresponding to the respective guide element.

Typically, the carrier track is supported by two upper guide elements and two lower guide elements, which can be positioned as pairs with respect to each other. For example, the axial position along the track of the upper guide element can correspond approximately with the axial position of the paired lower guide element. These so-called main upper and lower guide elements, are subject to relatively high loads. Due to the relatively large sliding contact of the guide elements with the carrier track, the loads may be better taken and distributed over the contact zone, reducing the stress concentrations on the carrier track surface.

It is preferred that the sliding surface of said at least one guide element is curved. As the carrier track generally follows an arcuate path during movement, a radius of curvature of said sliding surface preferably corresponds to a radius of curvature of the corresponding carrier track surface with which the sliding surface is in contact, thus optimizing surface contact between the sliding surfaces of said at least one guide element and said carrier track.

Advantageously, the sliding surface of said at least one guide element can comprise a self-lubricating material, alternatively it can comprise a material that requires lubrication. The sliding surface of said at least one guide element may for example be made of a different material than the housing of the guide element. In that case, the self-lubricating material may be part of an additional liner or coating, which can be made of any kind of material, as long as the resulting wear rate and friction coefficient are acceptable for the application, which can for example be the case for, but not limited to, the Kamatics' P54 wear strip, Dupont's VESPEL® or carbon-reinforced PEEK. Other materials may be suitable as well, as will be known to the person skilled in the art. Alternatively, the sliding surface of the at least one guide element may also be made out of the same material as the rest of the guide element, as long as said material allows direct sliding contact between the guide element and the carrier track. Further, alternatively and/or additionally, lubrication can be provided by adding lubricant to the sliding surface of the guide element and/or of the carrier track such that during movement of the guide element over the carrier track the lubricant is distributed over the respective surfaces. The lubricant can be added actively, e.g. by known means such as a pump.

Alternatively and/or additionally, at least one of a front side and a back side of said guide element seen in a direction of movement of said carrier track, and preferably both of said front side and said back side, includes an angle different from a substantially right angle with respect to the direction of movement of said carrier track. In this way, the majority of contaminants, which may accumulate on the carrier track, will be pushed sideward and removed from the carrier track during motion of said carrier track due to the orientation of the front side and/or back side of said guide element. A front side and/or a back side of the upper guide element may for example comprise two parts joining in a pointed edge, e.g. wedge shaped, such that the majority of accumulated contaminants can be wiped off to either side of the carrier track, and be removed from the track surface. Alternatively, said front and/or back side of the upper guide element may also not include a pointed edge, but an oblique edge only, such that the majority of accumulated contaminants are wiped off towards a single side of said carrier track. Alternatively, the front and/or back side of the upper guide element may include a straight edge. Further, the front and/or back side may be inclined with respect to the direction of movement and thus to the sliding surfaces, or may be approximately perpendicular to the direction of movement and thus to the sliding surfaces. Many variants are possible.

It may be preferred that a width of the sliding surface of said at least one guide element is smaller than a width of the corresponding surface of the carrier track, with which the guide element is in contact. In this way, ploughing of the carrier track side edges on the sliding surface of the guide elements may be avoided, in particular to avoid that the track sides make cuts in the guide element contact surface.

The at least one lower guide element, and/or upper guide element, can preferably include a number of sliding surfaces corresponding to the number of sliding surfaces of the carrier track. For example the at least one lower guide element may comprise two sliding surfaces in parallel with a direction of movement of said carrier track and arranged to contact two parallel lower surfaces of a PI-shaped carrier track. Each of the two sliding surfaces of the at least one lower guide element can thus provide sliding contact with the corresponding two parallel lower surfaces of the "legs" of the PI-shaped carrier track. Alternatively, the carrier track can be I-shaped, H-shaped, M-shaped, U-shaped or A-shaped or otherwise shaped. Many shapes may be possible.

As the two parallel sliding surfaces of the lower guide element are spaced apart and oriented in the direction of movement of the carrier track, the front and/or back sides of the at least one lower guide elements may comprise two separate, non-adjacent parts, which may each be oriented in an angle different from a substantially right angle with respect to the direction of movement of said carrier track to wipe off contaminants from the carrier track during movement of said carrier track. The front and/or back sides of the at least one guide element having at least two separate parts each provided with a sliding surface, may have front and/or back edges that may be wedge-like or oblique or approximately perpendicular with respect to the direction of movement. The front and/or back sides may also be oriented inclined or approximately perpendicular with respect to the sliding surface.

In a preferred embodiment, the guidance assembly may comprise a pin, which is connectable to the airfoil, and which defines a pin axis around which said guide element can pivot. In particular, the pin may be connectable to at least one rib of the airfoil, preferably to two substantially parallel ribs of the airfoil, wherein the pin connects said two airfoil ribs. Said pin is arranged to pass through a pin hole in said guide element, which is located between said two airfoil ribs. Said pin can assure a good contact between said guide elements and the carrier track, even in spite of possible track deformation under loading. As such, the pin can act as a shaft around which the guide element is rotatable.

The guide element can be embodied having a pin hole through which a pin shaft is receivable, wherein the pin hole is arranged as a tube-like element. At a side of the pin hole tube, a plate-like part can be provided, extending outwardly with respect to the tube element in a direction transverse to the tube element. At an outside of the plate-like part, the contact surface is provided that is configured to be in sliding contact with the corresponding surface on the carrier track. In an example, the contact surface can further be provided with a sliding liner or coating, e.g. a self-lubricating sliding liner or coating. Ribs may be provided extending between the plate element and the tube-like element in a direction transverse to the direction of the tube to accommodate load bearing.

More preferably, a middle part of said pin is axially asymmetrical. Due to the asymmetrical or eccentric middle part of the pin, which is the part that passes through the guide element's pin hole, the guide element can be adjusted or rigged on the carrier track at installation such that good contact between the guide elements and the carrier track is provided. It may be sufficient to only provide the at least one upper guide element with said asymmetrical pin rigging system, or both the upper and the lower guide elements may be provided with it.

Advantageously, the guidance assembly can comprise an inner bush between said pin and said at least one guide element. Said bush can enable the guide element to freely rotate around said pin axis, since axial torque load transfer to the guide element can be avoided, as the inner bush, as well as the pin, can fully transfer said axial torque load which is created by clamping of the said guidance assembly to said airfoil.

The guidance assembly may preferably also comprise at least one bush, preferably two bushes, preferably a shoulder bush and a sliding bush, arranged to connect said pin to said airfoil, more specifically to a rib of said airfoil. Due to an axial clamping of the pin, said shoulder bush cannot rotate nor slide axially. The sliding bush can allow axial sliding of the pin to cope with thermal effects, tolerances and/or bending of the airfoil, for example under loading.

The guidance assembly can advantageously comprise at least one spacer ring, preferably two spacer rings, located between said at least one bush and said guide element. Said ring can prevent direct metal-to-metal contact between the guide element, which may rotate, and the at least one bush, for example the shoulder bush, which is fixed with respect to the airfoil rib. The use of said spacer ring(s) can also prevent lateral movement of the guide element and assure good contact in between said guide element and said carrier track.

The guidance assembly can further preferably comprise at least one, preferably two, washers located between said pin and said at least one bush, in order to assure appropriate fixation of the said guidance assembly within the said airfoil.

Further an airfoil leading edge high-lift device carrier track for moving an airfoil leading edge high-lift device between a retracted position and an extended position may be provided wherein said carrier track is guidable by a guidance assembly, for example a guidance assembly according to any of the preceding claims, comprising at least one lower guide element arranged for contacting a lower surface of said carrier track and at least one upper guide element arranged for contacting an upper surface of said carrier track, wherein at least one of said lower or upper guide element includes a sliding surface arranged to be in sliding contact with said leading edge high-lift device carrier track during movement of said carrier track, wherein a surface roughness of said lower surface of said carrier track and said upper surface of said carrier track is configured to allow sliding contact with said at least one upper guide element and said at least one lower guide element.

Further, an actuation system can be provided for an airfoil leading edge high-lift device comprising a guidance assembly for an airfoil leading edge high-lift device carrier track as described above, leading to one of the above-mentioned advantages.

Further advantageous embodiments are set forth in the dependent claims.

Various modifications and additions can be made to the embodiments discussed without departing from the scope of the invention. For example, while the embodiments described above refer to particular features, the scope of this invention also included embodiments having different combination of features and embodiments that do not include all of the above described features.

BRIEF DESCRIPTION OF THE DRAWINGS

The present disclosure will be further elucidated with reference to a drawing. In the drawing.

It is to be noted that the figures are given by way of exemplary embodiments only. Corresponding elements are designated with corresponding reference numbers.

DETAILED DESCRIPTION

While various aspects and features of certain embodiments have been summarized above, the following detailed description illustrates a few embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described and claimed herein, and while various features are ascribed to different embodiments, it should be appreciated that the features described with respect to one embodiment may be incorporated with other embodiments as well. By the same token, however, no single feature or features of any described or claimed embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
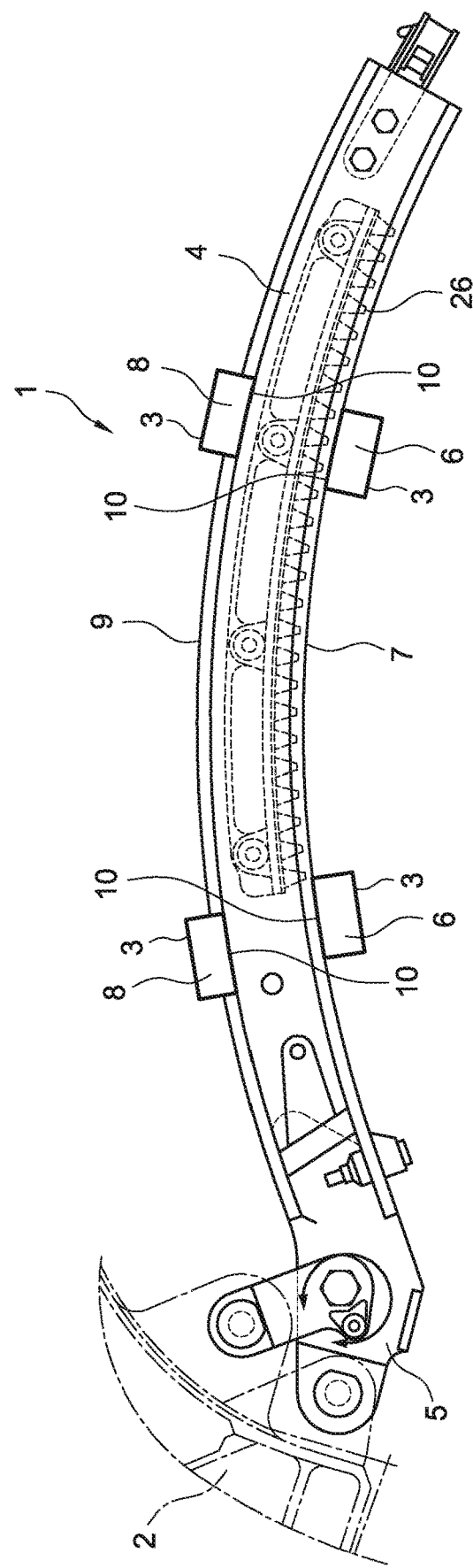
FIG. 1 shows a schematic side view of a preferred embodiment of an actuation system for an airfoil leading edge high-lift device according to an aspect of the invention.

FIG. 1 shows a schematic side view of a preferred embodiment of an actuation system 1 for an airfoil leading edge high lift device 2 according to an aspect of the invention. The actuation system 1 comprises a guidance assembly 3 and an airfoil leading edge high-lift device carrier track 4. The airfoil leading edge high-lift device 2, for example a slat, is attached to one end 5 of the carrier track 4. The high-lift device 2 can be fixedly or pivotally attached to said end 5, or otherwise connected. The carrier track 4 is here a curved or arcuate track and is movable between a retracted position in which the high-lift device is retracted with respect to the airfoil and an extended position, in which the leading edge high-lift device 2 is deployed with respect to the airfoil. The carrier track 4 can for example be actuated by a rack-and-pinion system, with the rack being located for example under the carrier track 4, or in case of a PI-shaped carrier track 4, between the legs of said PI-shaped track 4. In this embodiment, the carrier track 4 is PI-shaped, but another shape, such as U-shaped, I-shaped or A-shaped may be possible as well.

Figure 2:
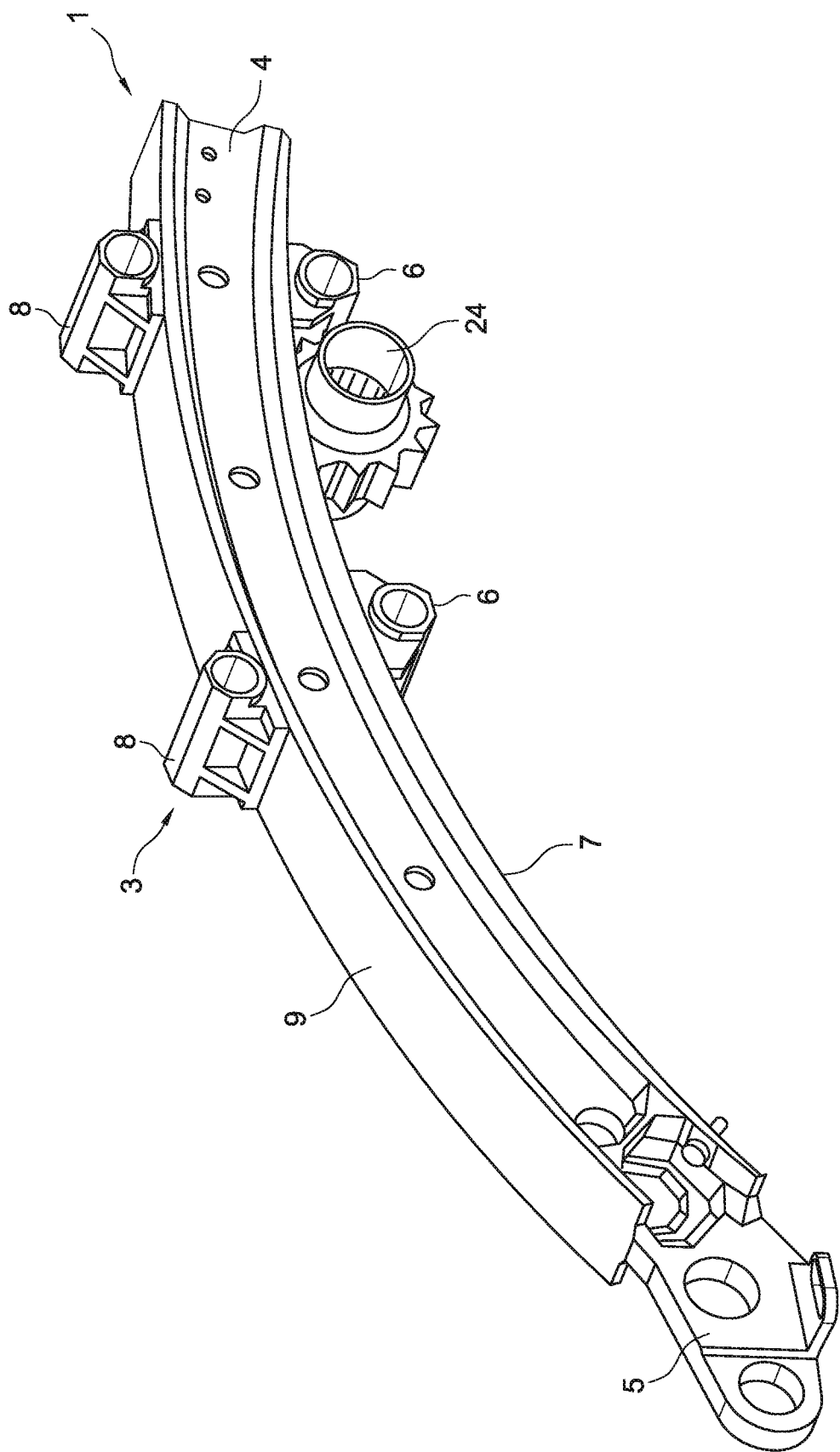
FIG. 2 shows a perspective view on a preferred embodiment of an actuation system according to an aspect of the invention.

The pinion 24, see FIG. 2, engages the rack 26, shown in FIG. 1, and can be connected to a drive mechanism for driving the pinion, and thus setting the rack 26, and the track 4 corresponding with it, in movement. The rack 26 is here positioned between the two legs of the PI-shaped track 4. The movement of said carrier track 4 is guided by the guidance assembly 3. The guidance assembly 3 comprises at least one lower guide element 6, in this case two lower guide elements 6, each contacting a lower surface 7 of said carrier track 4. The guidance assembly 3 also comprises at least one upper guide element 8, in this case two upper guide elements 8 contacting an upper surface 9 of said carrier track 4. The upper guide element 8 and the lower guide element 6 are in this embodiment arranged as pairs with respect to a carrier track 4, as can be seen in FIG. 1. A position of the upper guide element 8 here approximately corresponds with a position of the lower guide element 6 to provide optimal support and load bearing. Of course, other configurations may be possible, for example using two upper guide elements and a single lower guide element or vice versa.

According to the invention, at least one of said lower or upper guide element 6, 8, and preferably each of the guide elements 6, 8, include a sliding surface 10 arranged to be in sliding contact with said leading edge high-lift device carrier track 4 during movement of said carrier track 4. This is in contrast with prior art guidance assemblies, which generally include rollers in rotating contact with the upper and/or lower surface of the carrier track 4.

FIG. 2 shows a perspective view on a possible embodiment of an actuation system 1. The actuation system 1 comprises a guidance assembly 3 and a carrier track 4. The guidance assembly 3 preferably comprises two lower guide elements 6 and two upper guide elements 8, each including a sliding surface 10. The sliding surface 10 of said at least one guide element 6, 8 is curved, to provide good contact with the generally curved carrier track 4. The upper guide elements 8 are concavely curved in the sliding direction of the carrier track 4, whereas the lower guide elements 6 are convexly curved in said same sliding direction. Advantageously, the radius of curvature of the contact surfaces 10 of the upper and lower guide elements 6, 8 corresponds with the radius of curvature of the respective corresponding contact surfaces 7, 9 of the carrier track 4. The guidance assembly can optionally be complemented with side pads (not shown), for example sliding side pads to avoid lateral movement of the carrier track 4. In order to provide adequate sliding contact between the sliding surface 10 of said guide elements 6, 8 and said carrier track 4, a carrier track 4 is provided having a lower surface 7 and an upper surface 9 with a surface roughness configured to allow sliding contact with said at least one upper guide element 8 and said at least one lower guide element 6, for example a surface roughness of maximal 0.5 μm Ra, preferably 0.4 μm Ra. Additionally, lubrication may be provided, for example by using a self-lubricating material on the guide element and/or the carrier track, or by providing a lubricant on the sliding surface and/or the contact surface.

Figure 3B:
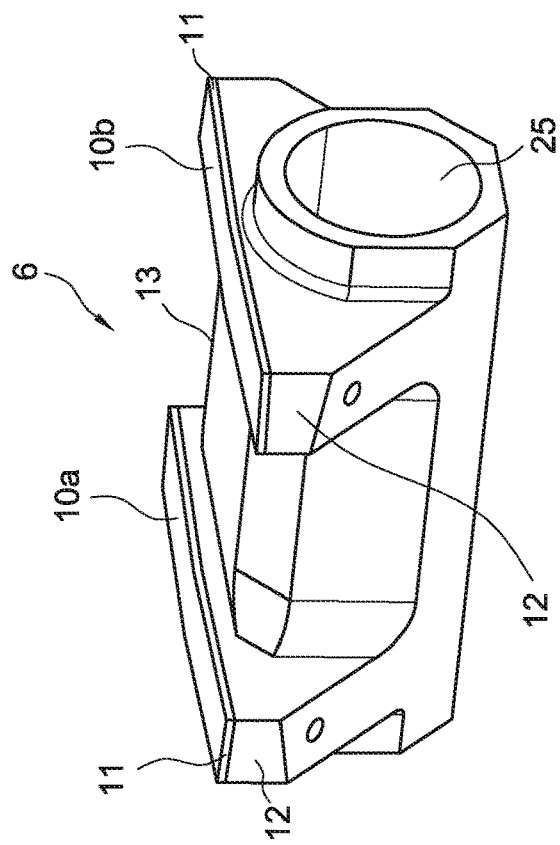
FIGS. 3a and 3b show a perspective view on a preferred embodiment of an upper guide element and a lower guide element respectively of a guidance assembly according to the first aspect of the invention.
Figure 3A:
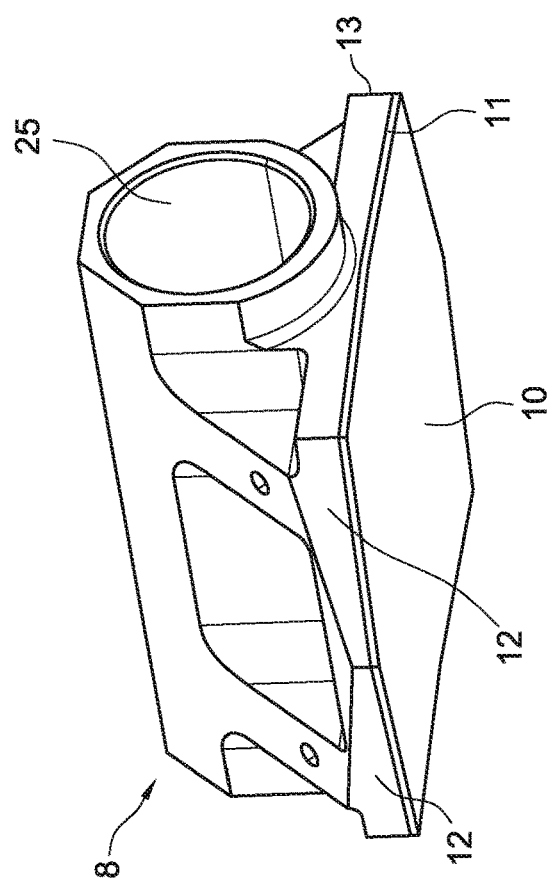

FIGS. 3a and 3b show a perspective view on a preferred embodiment of an upper guide element 8 and a lower guide element 6 respectively of a guidance assembly 3 according to the first aspect of the invention. The material used for the guide elements 6, 8 can be any material that allows sliding contact with the carrier track 4, for example any metallic and high strength composite or ceramic material. Said contact may be direct sliding contact between the housing of the guide element 6, 8 and the carrier track 4, or the sliding surface 10 of the guide element 6, 8 may comprise an additional liner or coating 11 in a different material, for example in a self-lubricating material. This material can be of any kind, as long as the resulting wear rates and friction coefficients are acceptable for the application. Examples of possible liner materials are Kamatics' P54, Dupont's VESPEL® or carbon-reinforced PEEK, or any other suitable material. In case of an additional liner or coating, the guide element can be made of any material which still provides acceptable sliding properties so that the guide elements would not get stuck or damage the carrier track 4. As can be seen in FIGS. 3a and 3b, the upper guide element 8 may be of a different design than the lower guide element 6, depending on the shape of the carrier track 4. In case of a PI-shaped carrier track, the lower guide element 6 can include two sliding surfaces 10a, 10b in parallel with a direction of movement of said carrier track 4 and arranged to contact two parallel lower surfaces 7 of a PI-shaped carrier track 4. In order to keep the carrier track 4 substantially free of contaminants, a front side 12 and/or a back side 13 of said guide element 6, 8 seen in a direction of movement of said carrier track 4 includes an angle different from a substantially right angle with respect to the direction of movement of said carrier track 4, such that the guide element 6, 8 wipes off contaminants to one or to both side of the carrier track 4 during movement of said carrier track. As the carrier track 4 moves back and forth, preferably both the front side 12 as the back side 13 of at least each upper guide element 8 include an angled front side. Alternatively, instead of two front sides joining in a point or edge around the middle of the guide element 8, the front side 12 may also comprise a single oblique front side, which may wipe all contaminants to a single side of the carrier track 4. As can be seen in FIG. 3b, the two front sides of the guide element 6 are also obliquely configured to wipe off contaminants from the two parallel lower surfaces 7 of the carrier track 4, each to one side of the carrier track 4.

Figure 4:
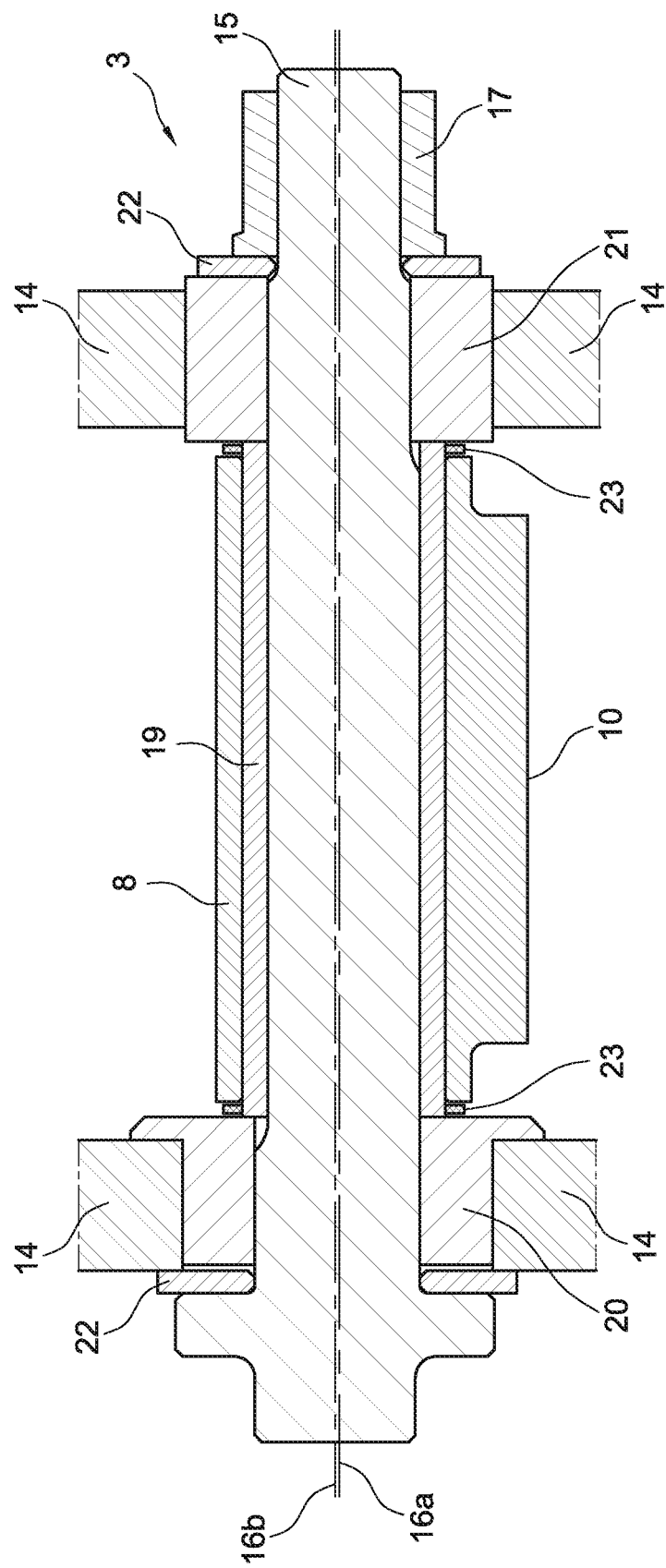
FIG. 4 shows a schematic cross-section of a preferred embodiment of a guidance assembly according to the first aspect of the invention.

Fixation of the guidance assembly 3 to the airfoil, and more particularly in between two ribs 14 of the airfoil, is illustrated in for example FIG. 4. FIG. 4 shows a schematic cross-section of a preferred embodiment of a guidance assembly. The upper guide element 8, as well as the lower guide element 6, includes a pinhole 25 over their entire width, i.e. transverse to the direction of actuation of the carrier track 4. This pin hole can receive a pin 15, which is connectable to the airfoil, in particular to two ribs 14 of the airfoil. The pin 15 defines a pin axis 16a around which said guide element 8 can pivot. The axis 16a, being the middle part of the pin, in particular the part substantially between said two ribs 14, of said pin 15 can be axially asymmetrical with respect to the axis 16b which coincides with the rib holes axis, providing an eccentric pin 15. This eccentric pin 15 allows for rigging of the guide element 8 with respect to the carrier track 4 at first installation simply by rotating said pin 15 around its axis 16b. In particular, the upper guide element 8 may need rigging, whereas the lower guide element 6 can also do with a concentric pin without rigging capabilities. Once the guide element 8 has been correctly adjusted on the carrier track 4, the pin 15 can be blocked against further rotation by various means known by the person skilled in the art. The guidance assembly 3 further comprises at least one bush, preferably two bushes, preferably a shoulder bush 20 and a sliding bush 21, arranged to connect said pin 15 to said airfoil, in particular to the ribs 14 of said airfoil. Alternatively, instead of providing a pin 15 with an asymmetrical middle part, the pin 15 can be made symmetrical, and at least one of the bushes 20, 21 can be made asymmetrical or eccentric, so as to provide a rigging system for the guide elements 6, 8. Two washers 22, located between the head of said pin 15 and one of said airfoil ribs 14 on the one hand, and between said sliding bush 21 and the nut 17 on the other hand, can assure appropriate fixation of the said guidance assembly 3 in between the said airfoil ribs 14 due to the axial clamping by the nut 17. The guidance assembly 3 further comprises an inner bush 19 between said pin 15 and said guide element 8, allowing free rotation of the guide element 8 around the inner bush 19, which is fixed with respect to the pin 15 due to the axial clamping force created by torqueing the nut 17. A width of the sliding surface 10 of said at least one guide element 6, 8 is smaller than a width of the corresponding surface 7, 9 of the carrier track 4, with which the guide element 6, 8 is in contact. Between said shoulder bush 20 and said guide element 8, and/or between said sliding bush 21 and said guide element 8, the guidance assembly 3 may include at least one spacer ring 23, preferably two spacer rings, i.e. one ring on each lateral side of the guide element 8, to avoid rubbing contact between the possibly rotating guide element 8 and the fixed bush 20 and/or 21, to prevent lateral movement of the guide element 8 and hence assuring good contact in between said sliding surface 10 and corresponding surface 9 of said carrier track 4.

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

What is claimed is:

1. A guidance assembly for guiding and supporting a movement of an airfoil leading edge high-lift device carrier track between a retracted position and an extended position, comprising at least one lower guide element arranged for contacting a lower surface of said carrier track and/or at least one upper guide element arranged for contacting an upper surface of said carrier track, wherein at least one of said lower or upper guide element includes a sliding surface arranged to be in sliding contact with said leading edge high-lift device carrier track during operational movement of said carrier track, and wherein at least one of said lower or upper guide element is configured to pivot about a pivot axis transverse a direction of operational movement of said carrier track.

2. The guidance assembly according to claim 1, wherein the at least one of said lower or upper guide element comprises two lower and two upper guide elements including a sliding surface arranged to be in sliding contact with said high-lift device carrier track during operational movement of said carrier track.

3. The guidance assembly according to claim 1, wherein the sliding surface of said at least one lower or upper guide element guide element is curved.

4. The guidance assembly according to claim 1, wherein the sliding surface of said at least one lower or upper guide element comprises a self-lubricating material or a material requiring lubrication.

5. The guidance assembly according to claim 1, wherein at least one of a front side and a back side of said at least one lower or upper guide element seen in a direction of movement of said carrier track has an inclination with respect to the direction of movement of said carrier track.

6. The guidance assembly according to claim 1, wherein a width of the sliding surface of said at least one lower or upper guide element is smaller than a width of the corresponding surface of the carrier track, with which the at least one lower or upper guide element is in contact.

7. The guidance assembly according to claim 1, wherein said at least one lower or upper guide element includes a number of sliding surfaces oriented in a direction of movement of said carrier track and arranged to contact a corresponding number of contact surfaces of a carrier track.

8. The guidance assembly according to claim 1, comprising a pin, which is connectable to the airfoil, and which defines a pin axis transverse a direction of operational movement of said carrier track corresponding to the pivot axis around which said at least one of said lower or upper guide element is pivotable.

9. The guidance assembly according to claim 8, wherein said pin is axially asymmetrical.

10. The guidance assembly according to claim 8, comprising an inner bush between said pin and said at least one of said lower or upper guide element.

11. The guidance assembly according to claim 8, comprising at least one bush arranged to connect said pin to said airfoil.

12. The guidance assembly according to claim 11, comprising at least one spacer ring located between said at least one bush and said at least one of said lower or upper guide element.

13. The guidance assembly according to claim 11, comprising at least one washer located between said pin and said at least one bush.

14. The guidance assembly according to claim 11 wherein the at least one bush comprises a shoulder bush and a sliding bush.

15. The guidance assembly according to claim 12 wherein the at least one spacer ring comprises two spacer rings located between said at least one bush and said at least one of said lower or upper guide element.

* * * * *